United States Patent [19]

Bening et al.

[11] Patent Number: 5,284,901
[45] Date of Patent: Feb. 8, 1994

[54] HYDROXYL FUNCTIONAL DERIVATIVES OF EPOXIDIZED DIENE POLYMERS AND PROCESS FOR MAKING THEM

[75] Inventors: Robert C. Bening; James R. Erickson, both of Katy; Charles J. Stark; David J. St. Clair, both of Houston, all of Tex.

[73] Assignee: Shell Oil Company, Houston, Tex.

[21] Appl. No.: 49,687

[22] Filed: Apr. 16, 1993

Related U.S. Application Data

[62] Division of Ser. No. 863,580, Apr. 3, 1992.

[51] Int. Cl.$^5$ .............................................. C08F 8/00
[52] U.S. Cl. ..................................... 524/505; 525/98; 525/332.8; 525/332.9
[58] Field of Search ............... 524/505; 525/98, 332.8, 525/332.9

[56] References Cited

U.S. PATENT DOCUMENTS

| | | |
|---|---|---|
| 3,448,174 | 6/1969 | Loveless et al. |
| 3,607,977 | 9/1968 | Taylor et al. |
| 3,607,982 | 6/1970 | Winkler et al. |
| 4,528,340 | 7/1985 | Hayashi et al. |
| 4,668,733 | 5/1987 | Anzinger et al. |
| 5,015,697 | 5/1991 | Riddick . |

FOREIGN PATENT DOCUMENTS

| | | |
|---|---|---|
| 3442200 | 5/1986 | Fed. Rep. of Germany . |
| 54-034198 | 7/1979 | Japan . |
| 55-152762 | 11/1980 | Japan . |
| 57-048001 | 10/1982 | Japan . |
| 60-053511 | 3/1985 | Japan . |
| 64-43503 | 2/1989 | Japan . |
| 1-043503 | 2/1989 | Japan . |

OTHER PUBLICATIONS

M. V. Sefton, *Polymerization Preparation*, American Chemical Society, Div. of Polym. Chem., 16(2), pp. 52-57, 1975 (abstract only).

(List continued on next page.)

Primary Examiner—Bernard Lipman
Attorney, Agent, or Firm—Donald F. Haas

[57] ABSTRACT

A process for making polymers of conjugated dienes which contain hydroxyl groups, including highly reactive primary hydroxyl groups, in the diene blocks which comprises (a) making a precursor polymer by polymerizing at least one conjugated diene which leaves 1,2 disubstituted, 1,1 disubstituted, 1,1,2 trisubstituted or tetrasubstituted olefinic unsaturation in the polymer, (b) optionally partially hydrogenating said precursor polymer, (c) epoxidizing said precursor polymer such that epoxy groups form at said substituted sites and the amount of epoxy functionality in the polymer is from at least 0.1 Meq/g polymer, and (d) reacting the epoxidized polymer with an alcohol having one unprotected hydroxyl group in a solvent in the presence of a Lewis acid selected from the group consisting of $MX_n$ where M is selected from the group consisting of boron, aluminum, iron and tin, and X is a halogen, and organic complexes of such acids.

A diene polymer containing 0.01 to 15 Meq/g polymer of hydroxyl group, preferably including highly reactive primary hydroxyl groups, and comprised of ether-alcohol units of the formula

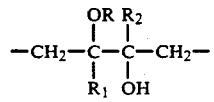
(F)

or

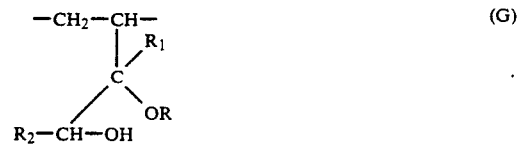
(G)

where R is selected from the group consisting of alkyl radicals containing up to 10 carbon atoms, monohydric and dihydric alcohol groups and carbonate groups; and $R_1$ and $R_2$ are hydrogen or alkyl radicals wherein in (G) only one of $R_1$ or $R_2$ is hydrogen.

18 Claims, No Drawings

OTHER PUBLICATIONS

M. V. Sefton, et al., *Journal of Polymer Science, Polymer Chemistry Ed.*, 14(7), pp. 1581–1597, 1976 (abstract only).

I. A. Tutorskii, et al., *Vysokomol. Soedin., Ser. A*, 25(2), pp. 418–422, 1983 (abstract only).

"Cationic Graft Copolymerization" by J. P. Kennedy, *Journal of Applied Polymer Science: Applied Polymer Symposium* 30, pp. 153–163 (1977).

"Graft Copolymers by Oxonium Ion Polym. III. Grafting Polytetrahydrofuran Onto Butyl Rubber and EPDM Epoxides" by Dreyfuss and Kennedy, *Journ. of Appl. Polym. Sci.: Appl. Polym. Symp.* 30, pp. 165–178 (1977).

"Graft Copolymers by Oxonium Ion Polym. IV. Grafting Tetrahydrofuran Through EPDM and Butyl Rubber Epoxides" by Dreyfuss and Kennedy, *Journ. of Appl. Polym. Sci.: Appl. Polym. Symp.* 30, pp. 179–182 (1977).

"Graft Copolymers by Oxonium Ion Polymerization: Rubber Epoxides as Sites for Addition of Polytetrahydrofuran Grafts", by Dreyfuss and Kennedy, *Journ. of Appl. Polym. Sci.: Appl. Polym. Symp.* 30, pp. 47–58.

"Heterocyclic Compounds With Three- and Four-Membered Rings: Part One", Edited by Weissberger, *The Chemistry of Heterocyclic Compounds, A Series of Monographs*, pp. 288–317 (1964).

HYDROXYL FUNCTIONAL DERIVATIVES OF EPOXIDIZED DIENE POLYMERS AND PROCESS FOR MAKING THEM

This is a division of application Ser. No. 07/863,580, filed Apr. 3, 1992, pending.

BACKGROUND OF THE INVENTION

This invention relates to block polymers of conjugated dienes which contain hydroxyl groups, including highly reactive primary hydroxyl groups, in the diene blocks. The invention also relates to a process for making such polymers from epoxidized diene block polymers.

Conventional A-B-A block copolymers are known to be useful in coatings, sealants, adhesives and modified asphalts but their usefulness in such products is not as great as it could be if these polymers did not suffer from deficiencies in certain physical properties. For instance, U.S. Pat. No. 3,792,005 disclosed that coatings can be made using block polymers of A-B-A type where A is a monovinyl aromatic polymer block, usually polystyrene (S), and B is a rubber polymer block, usually hydrogenated polybutadiene (EB) or hydrogenated polyisoprene (EP). These polymers could be especially useful in elastomeric coatings because they can be formulated to have good flexibility and therefore, will not crack during thermal cycling, an important requirement for roof coatings, for example, or during metal forming, where the coating becomes stretched as the metal is bent. However, coatings based on conventional A-B-A type block copolymers are deficient in that they lack strong adhesion and in applications in which the coating will contact organic liquids such as gasoline, or high temperatures, the coatings merely dissolve or melt off of the substrate.

It would be advantageous to provide block polymers of this type which had enhanced physical properties. By functionalizing these conventional block polymers, they can be crosslinked to give polyurethane structures which will have better physical properties and thus be more useful than the conventional block polymers in many coatings, sealants, adhesives and modified asphalts.

The known curable or crosslinked coatings which are based on vinyl aromatics and conjugated diolefins do not have particularly good long term heat, weather and ultraviolet stability due to the need to utilize unhydrogenated polymers (it is difficult to add functional groups without using unhydrogenated polymers). Hydrogenation is known to improve long term heat, weather and ultraviolet stability, but it removes the double bonds which are needed to add functional groups which can be crosslinked.

It is an object of the present invention to provide a block polymer which can be modified so that it is substantially free of residual olefinic double bonds and can be crosslinked by reaction with amino resins and isocyanates. Further, it is an object of this invention to provide a coating composition which is based on this crosslinkable block polymer.

It is also an object of the present invention to provide a process for making such hydroxyl functional block polymers which achieves high conversion to a well defined product under mild conditions. In the past, protic acid and Lewis acid catalysts have been used to react epoxidized polymers such as disclosed in U.S. Pat. No. 5,015,697. However, protic acid catalysts generally require long reaction times and many Lewis acid catalysts lead to side reactions such as ketone or aldehyde formation. Gel formation has also been a problem in these systems. It would be advantageous to provide a process for making hydroxyl functional derivatives of epoxidized diene block polymers under mild conditions which avoid these problems. The present invention provides such a means by opening hindered epoxy rings to introduce hydroxyl functionality, including primary hydroxyls, to the polymer backbone.

Epoxidation has proven to be widely applicable to block copolymers of vinyl aromatic hydrocarbons and conjugated dienes, including partially unsaturated versions thereof, as discussed in U.S. Pat. No. 3,555,112 and U.S. Pat. No. 3,607,982. Unfortunately, the resulting epoxides of such polymers do not readily participate in reactions used to cure most coatings. Conversion to hydroxyl functionality would be highly desirable but, as discussed above, there are disadvantages to the currently known processes.

SUMMARY OF THE INVENTION

The process of the present invention is one for making elastomeric polymers of conjugated dienes which contain hydroxyl functionality, preferably including highly reactive primary hydroxyl groups, in the diene blocks. The process comprises first making a precursor polymer by polymerizing at least one conjugated diene which leaves 1,2 disubstituted, 1,1 disubstituted, 1,1,2 trisubstituted or tetrasubstituted olefinic unsaturation in the polymer, epoxidizing the polymer such that at least 0.1 milliequivalents of epoxy groups per gram of polymer form primarily at the 1,2 disubstituted, 1,1 disubstituted, trisubstituted or tetrasubstituted sites, and then reacting the epoxidized polymer with an alcohol having one unprotected hydroxyl group in the presence of a Lewis acid of the type $MX_n$, where $M=B$, Al, Fe, Sn, and X is a halogen, or organic complexes of these acids, in a solvent.

In a preferred embodiment, the conjugated dienes described above are copolymerized, either randomly, or in blocks, with conjugated diene monomers that leave only vinyl or 1,2 disubstituted olefinic sites. These sites are hydrogenated, either before or after epoxidation, such that the final epoxidized product contains 0.1 to 5 Meq/g of polymer of epoxy groups and less than 1 milliequivalent of residual olefin per gram of polymer (Meq/g), preferably less than 0.6 and most preferably less than 0.3. In the most preferred embodiment of this invention, polymerization is carried out such that 0.3 to 3.5 Meq/g polymer of disubstituted, trisubstituted or tetrasubstituted olefin is present in the precursor polymer, substantially all of the vinyl and most of the 1,2 disubstituted olefins are consumed by partial hydrogenation and epoxidation is carried out to consume the remaining olefins such that no more than 0.3 Meq/g polymer of unsaturation remains in the epoxidized polymer.

In a preferred embodiment of the process, the catalyst is selected from the group consisting of organic complexes of boron trifluoride particularly boron trifluoride diethyl etherate, boron trifluoride dibutyl etherate, boron trifluoride dimethyl etherate or boron trifluoride t-butyl methyl etherate. It is preferred that the alcohol having one unprotected hydroxyl group is selected from the group consisting of monohydric alcohols, and derivatives of dihydric and trihydric alcohols having one unprotected hydroxyl group, the remaining hydroxyl groups being protected as the acetal, ketal or carbonate. Preferred examples of such compounds are butanol, octanol, Solketal and trimethylolpropane ketal (the acetone ketal of trimethylolpropane).

The polymer of the present invention is a conjugated diene polymer containing 0.1 to 15 Meq/g polymer of hydroxyl groups, which may include highly reactive primary hydroxyl groups, in the diene blocks. The polymer is comprised of ether alcohol groups of the formula

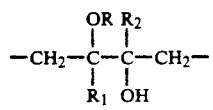

(F)

or

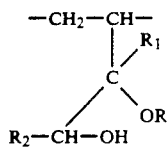

(G)

where R is selected from the group consisting of alkyl radicals containing up to 10 carbon atoms, monohydric and dihydric alcohol groups and carbonate groups; and $R_1$ and $R_2$ are hydrogen or alkyl radicals but in (G) only one of $R_1$ or $R_2$ can be hydrogen. The polymer may also contain the corresponding ether-alcohol units in which the ether linkage occurs through the less-substituted carbon of the epoxy precursor. The substituent attached to the polymer backbone through the ether radical may be a simple alkyl group or an alcohol radical containing up to two primary hydroxyl groups. The polymer may also contain (a) hydrogenated diene monomer(s) which may be the diene monomers from which the ether-alcohol units were derived or another diene monomer, (b) epoxidized diene monomer(s) and/or (c) residual olefin. In the preferred embodiment, the total residual olefin is less than 1, preferably less than 0.6 and most preferably less than 0.3, Meq/g polymer.

In a preferred embodiment, sufficient ether-alcohol is present such that 0.25 to 9 Meq/g polymer of hydroxyl groups are present. In the most preferred embodiment, at least ⅓ of the hydroxyl groups are primary and present as part of the ether radical (OR). In another embodiment of the invention, hydrogenation products of a diene monomer that polymerizes to give only vinyl or 1,2 disubstituted olefin residue may also be present in the polymer. In yet another embodiment of the invention, the polymer or an individual block of the polymer may contain up to 75% randomly-distributed monoalkenyl aromatic hydrocarbon monomer residues. The amount of such alkyl aryl monomers in an individual block of the polymer can be as high as 99% provided that sufficient conjugated diene monomer is used to give the required number of epoxidation sites.

DETAILED DESCRIPTION OF THE INVENTION SECTION

The general methods of making block copolymers are reviewed by R. P. Quirk and J. Kim, "Recent Advances in Thermoplastic Elastomer Synthesis", *Rubber Chemistry and Technology*, volume 64 No. 3 (1991), which is incorporated herein by reference. Especially useful is the method of sequential anionic polymerization of monomers. Since the types of monomers that will undergo living polymerization are relatively limited for the anionic method, with the most favorable being conjugated diolefins and styrenes, partial hydrogenation of the anionic block copolymer is normally needed to attain some of the unepoxidized polymer of the present invention. Polymers made by sequential polymerization of a suitable diolefin monomer and a monomer having only one carbon-carbon double bond or by sequential polymerization of two different mixtures (ratios) of such monomers, using either a monofunctional initiator, a monofunctional initiator and a coupling agent or a multifunctional initiator, may not have to be hydrogenated.

The polymers containing olefinic unsaturation or both aromatic and olefinic unsaturation may be prepared using anionic initiators or polymerization catalysts. Such polymers may be prepared using bulk, solution or emulsion techniques. Polymers prepared in solution are preferred for subsequent partial hydrogenation.

A very useful embodiment of this invention may be conveniently prepared by anionic polymerization, preparing blocks A and B, and optionally arm C (described below), consisting of homopolymers or copolymers of conjugated diene monomers or copolymers of conjugated diene monomers and alkyl aryl monomers (75% or less alkyl aryl monomer) wherein the monomers used for the A blocks are such that the A blocks have a greater number of 1,1 disubstituted, trisubstituted or tetrasubstituted olefinic unsaturation sites per unit of block mass than do the B blocks. The polymer may be partially hydrogenated with a suitable catalyst and conditions that favor the hydrogenation of the double bonds that are monosubstituted (vinyl) or 1,2 disubstituted (and also leaves aromatic double bonds intact), such that between 0.2 and 11.6 Meq/g polymer of 1,1 disubstituted, trisubstituted or tetrasubstituted olefinic unsaturation sites are left intact. The B blocks, on average, will contain a lesser amount of olefinic double bonds. A special case is where A is a polyisoprene block, for which all of the residual double bonds are 1,1 disubstituted (3,4 isoprene repeat unit) or trisubstituted (1,4 isoprene repeat units), and B is a polybutadiene block, for which only monosubstituted (vinyl) or 1,2 disubstituted residual double bonds are present. Partial hydrogenation of this polymer works extremely well. When B is polybutadiene and this block is to react with a coupling agent, it is often convenient to use a miniblock of oligoisoprene or oligostyrene, to improve the consistency of the coupling process when making star polymers. The polymer can be epoxidized to provide about 0.2 to about 10 milliequivalents of epoxy per gram of A block, while the B blocks will contain a lesser amount of epoxy, due to epoxidation of residual 1,2 disubstituted olefin.

Another example would be the sequential polymerization of a single conjugated diene monomer under two sets of reaction conditions, such as the anionic polymerization of 1,3-butadiene in cyclohexane to produce 1,4-polybutadiene followed by addition of a structure modifier and an ether solvent and polymerization of high 1,2-polybutadiene, followed by coupling and selective hydrogenation of 1,2-polybutadiene to give A-B-A.

In another example, 1,1 disubstituted, trisubstituted and tetrasubstituted olefin sites can be randomly distributed among 1,2 disubstituted and vinyl olefin sites, for example, by copolymerizing butadiene and isoprene in the presence of a structure modifier and an ether solvent. Partial hydrogenation of such a polymer would allow the introduction of ether-alcohol functionality at levels limited by the amount of the monomer that polymerizes to yield slower-hydrogenating olefin sites that was added to the polymerization feed.

In general, when solution anionic techniques are used, conjugated diolefin polymers and copolymers of conjugated diolefins and alkenyl aromatic hydrocarbons are prepared by contacting the monomer or monomers to be polymerized simultaneously or sequentially with an anionic polymerization initiator such as group IA metals, their alkyls, amides, silanolates, napthalides, biphenyls and anthracenyl derivatives. It is preferred to use an organo alkali metal (such as sodium or potassium) compound in a suitable solvent at a temperature within the range from about −150° C. to about 300° C., preferably at a temperature within the range from about 0° C. to about 100° C. Particularly effective anionic polymerization initiators are organo lithium compounds having the general formula:

$$RLi_n \qquad (I)$$

wherein R is an aliphatic, cycloaliphatic, aromatic or alkyl-substituted aromatic hydrocarbon radical having from 1 to about 20 carbon atoms and n is an integer of 1 to 4.

Conjugated diolefins which may be polymerized anionically include those conjugated diolefins containing from about 4 to about 24 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Isoprene and butadiene are the preferred conjugated diene monomers for use in the present invention because of their low cost and ready availability. Other conjugated diolefins which may be used in the present invention include 2-ethyl-1,3-butadiene, 2-propyl-1,3-butadiene, 2-butyl-1,3-butadiene, 2-pentyl-1,3-butadiene (2-amyl-1,3-butadiene), 2-hexyl-1,3-butadiene, 2-heptyl-1,3-butadiene, 2-octyl-1,3-butadiene, 2-nonyl-1,3-butadiene, 2-decyl-1,3-butadiene, 2-dodecyl-1,3-butadiene, 2-tetradecyl-1,3-butadiene, 2-hexadecyl-1,3-butadiene, 2-isoamyl-1,3-butadiene, 2-phenyl-1,3-butadiene, 2-methyl-1,3-pentadiene, 2-methyl-1,3-hexadiene, 2-methyl-1,3-heptadiene, 2-methyl-1,3-octadiene, 2-methyl-6-methylene-2,7-octadiene (myrcene), 2-methyl-1,3-nonyldiene, 2-methyl-1,3-decyldiene, and 2-methyl-1,3-dodecyldiene, as well as the 2-ethyl, 2-propyl, 2-butyl, 2-pentyl, 2-hexyl, 2-heptyl, 2-octyl, 2-nonyl, 2-decyl, 2-dodecyl, 2-tetradecyl, 2-hexadecyl, 2-isoamyl and 2-phenyl versions of all of these dienes. Also included are disubstituted conjugated diolefins including 2,3-dialkyl-substituted conjugated diolefins such as 2,3-dimethyl-1,3-butadiene, 2,3-diethyl-1,3-pentadiene, 2,3-dimethyl-1,3-hexadiene, 2,3-diethyl-1,3-heptadiene, 2,3-dimethyl-1,3-octadiene and the like; and 2,3-fluoro-substituted conjugated diolefins such as 2,3-difluoro-1,3-butadiene, 2,3-difluoro-1,3-pentadiene, 2,3-difluoro-1,3-hexadiene, 2,3-difluoro-1,3-heptadiene, 2,3-fluoro-1,3-octadiene and the like. Alkenyl aromatic hydrocarbons which may be copolymerized include vinyl aryl compounds such as styrene, various alkyl-substituted styrenes, alkoxy-substituted styrenes, vinyl napthalene, alkyl-substituted vinyl napthalenes and the like.

Conjugated dienes can also be copolymerized with methacrylates, such as t-butyl methacrylate, as described in U.S. Pat. No. 5,002,676, which is incorporated herein by reference, and such copolymers can be partially hydrogenated and epoxidized as described herein. The preferred use position for methacrylates, when used in the polymer, is in the C arms (described below).

In general, any of the solvents known in the prior art to be useful in the preparation of such polymers may be used. Suitable solvents, then, include straight- and branched chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as alkyl-substituted derivatives thereof; aromatic and alkyl-substituted aromatic hydrocarbons such as benzene, napthalene, toluene, xylene and the like; hydrogenated aromatic hydrocarbons such as tetralin, decalin and the like; linear and cyclic ethers such as methyl ether, methylethyl ether, diethyl ether, tetrahydrofuran and the like.

More specifically, the polymers of the present invention are made by the anionic polymerization of conjugated diene-- monomers and alkenyl aromatic hydrocarbon monomers in a hydrocarbon solvent at a temperature between 0° and 100° C. using an alkyl lithium initiator. The living polymer chains are usually coupled by addition of divinyl monomer to form a star polymer. Additional monomers may or may not be added to grow more arms, C arms, or to terminally functionalize, such as with ethylene oxide or carbon dioxide to give hydroxyl or carboxyl groups, respectively, and the polymer and the living chain ends are quenched with a proton source. Polymerization may also be initiated from monomers such as m-divinylbenzene and m-diisopropenylbenzene treated with butyl lithium.

There are a wide variety of coupling agents or initiators that can be employed. Any polyfunctional coupling agent which contains at least two reactive sites can be employed. Examples of the types of compounds which can be used include the polyepoxides, polyisocyanates, polyimines, polyaldehydes, polyketones, polyanhydrides, polyesters, polyhalides, and the like. These compounds can contain two or more types of functional groups such as the combination of epoxy and aldehyde groups, isocyanate and halide groups, and the like. Many suitable types of these polyfunctional compounds have been described in U.S. Pat. Nos. 3,595,941; 3,468,972, 3,135,716; 3,078,254; 4,096,203 and 3,594,452 which are herein incorporated by reference. When the coupling agent has two reactive sites such as dibromoethane, the polymer will have a linear ABA structure. When the coupling agent has three or more reactive sites, such as silicon tetrachloride, the polymer will have a branched structure, such as $(AB)_nY$. Coupling monomers are coupling agents where several monomer units are necessary for every chain end to be coupled. Divinylbenzene is the most commonly used coupling monomer and results in star polymers.

The polymers optionally may be partially hydrogenated. It may take place before or after epoxidation. Preparation of polymers which have controllable and predictable amounts of residual olefinic unsaturation is disclosed in U.S. Pat. No. 4,879,349 which is herein incorporated by reference. The process disclosed therein includes copolymerizing substituted and unsubstituted conjugated diolefins and hydrogenating the copolymer under conditions which are effective to substantially hydrogenate the olefinic unsaturation which lacks tertiary substitution (contains vinyl or 1,2 disubstitution), but leave the remaining olefinic unsaturation substantially unhydrogenated. Partial hydrogenation utilizing the process described in this patent is preferred because of the excellent controllability of the amount of residual unsaturation. It is likely that better performance will be achieved when the catalyst disclosed in the patent is replaced by a titanium catalyst such as is disclosed in U.S. Pat. No. 5,039,755 entitled "Selective Hydrogenation of Conjugated Diolefin Polymers" which is herein incorporated by reference. Further, it is likely that better performance will be achieved if the polymerization process described in that patent, utilizing termination of polymerization by hydrogen, is used herein.

In a preferred embodiment the polymers are partially hydrogenated prior to epoxidation and the A blocks contain a greater concentration of 1,1 disubstituted, 1,1,2 trisubstituted or tetrasubstituted olefinic double bonds (SDB) than the B blocks and the A blocks contain from 0.2 to 11.6 Meq/g polymer of such double bonds, preferably within the range of 0.5 to 9 Meq/g and most preferably to 0.1 to 5.4 Meq/g. Preferably, the ratio of the concentration (Meq/g) of such double bonds in A to the concentration in B should be greater than 3:1. More preferably, the ratio should be greater than 5:1 because it is generally valuable to confine functionality to blocks, particularly if it is desirable to maintain elastomeric properties after crosslinking. When the end use for the polymer is for pressure sensitive adhesives or flexible coatings, it is often useful for the B blocks to contain little or no SDB'S. If polymerization placed greater amounts of double bonds in the A or B blocks, the polymer would have to be epoxidized to a greater extent to remove most of the double bonds. This leads to polymers that have water sensitivity in the A blocks, that over-crosslink, especially in the B blocks, have little elasticity and thus are unsuitable for the applications intended.

After partial hydrogenation, the glass transition temperature of polymers intended for pressure-sensitive applications should normally be less than about 10° C., preferably less than about −15° C. and most preferably less than about −40° C. Polymers with higher Tg's in the A blocks are not as soft, while polymers with higher Tg's in the B blocks are not as elastomeric. Polymers with higher Tg's in the B block may be desirable for coatings, where tack is to be avoided.

Partial hydrogenation is diene selective. Generally, the rate of hydrogenation is much greater for carbon-carbon double bonds in which neither of the carbons is tertiary, as found in mono- and 1,2 disubstituted olefins, than for carbon-carbon double bonds in which one of the carbons is a tertiary carbon, as found in 1,1 di-, 1,1,2 tri- and tetrasubstituted olefins. The rate of epoxidation of carbon-carbon double bonds is just the opposite. Tertiary carbons promote epoxidation with peroxyacids better than secondary carbons, which in turn are better than primary carbons. Thus, the polymers described are especially suitable for the processes of partial hydrogenation or epoxidation and are especially suitable for the sequential use of both processes on the polymer. Use of partial hydrogenation alone on the present polymers preferentially leaves a greater number per unit of weight of residual diene double bonds in the A blocks of the polymers, while use of epoxidation alone produces a greater number of epoxidized diene monomers per unit of block weight in the A blocks than the B blocks. Epoxidation is also selective, favoring the disubstituted, trisubstituted and tetrasubstituted olefins and the resulting epoxies are resistant to hydrogenation, so that saturated polymers can also be made by hydrogenation of the less substituted-olefins following epoxidation.

Whether or not the polymer is to be hydrogenated, it must be epoxidized such that at least 0.1 Meq/g polymer of epoxy is in the polymer or there will be insufficient functionality to provide sufficient hydroxyl groups to provide the advantages of the invention. The preferred range is 0.1 to 5 Meq/g and most preferred is 0.25 to 3 Meq/g.

The epoxidized copolymers can be prepared by the epoxidation procedures as generally described or reviewed in the *Encyclopedia of Chemical Technology* 19, 3rd ed., 251–266 (1980), D. N. Schulz, S. R. Turner, and M. A. Golub, *Rubber Chemistry and Technology*, 5, 809 (1982), W-K. Huang, G-H. Hsuie, and W-H. Hou, *Journal of Polymer Science, Part A: Polymer Chemistry*, 26, 1867 (1988), K. A. Jorgensen, *Chemical Reviews*, 89, 431 (1989), and Hermann, Fischer and Marz, *Angew. Chem. Int. Ed. Engl.* 30 (No. 12), 1638 (1991), all of which are incorporated by reference.

For instance, epoxidation of the base polymer can be effected by reaction with organic peracids which can be preformed or formed in situ. Suitable preformed peracids include peracetic and perbenzoic acids. In situ formation may be accomplished by using hydrogen peroxide and a low molecular weight carboxylic acid such as formic acid. Alternatively, hydrogen peroxide in the presence of acetic acid or hydrogen peroxide in the presence of acetic anhydride and a cationic exchange resin will form a peracid. The cationic exchange resin can optionally be replaced by a strong acid such as sulfuric acid or p-toluenesulfonic acid. The epoxidation reaction can be conducted directly in the polymerization cement (polymer solution in which the polymer was polymerized) or, alternatively, the polymer can be redissolved in an inert solvent such as toluene, benzene, hexane, cyclohexane, methylene chloride and the like and epoxidation conducted in this new solution or the polymer can be epoxidized neat. Epoxidation temperatures on the order of 0 to 130° C. and reaction times from 0.1 to 72 hours may be utilized. When employing hydrogen peroxide and acetic acid together with a catalyst such as sulfuric acid, the product can be a mixture of epoxide and hydroxy ester. The use of peroxide and formic acid in the presence of a strong acid may also result in diolefin polymer blocks containing both epoxide and hydroxy-ester groups. Due to these side reactions caused by the presence of an acid, it is preferable to carry out the epoxidation at the lowest possible temperature and for the shortest time consistent with the desired degree of epoxidation. Epoxidation may also be accomplished by treatment of the polymer with hydroperoxides or oxygen in the presence of transition metals such as Mo, W, Cr, V and Ag.

Epoxidized and optionally selectively hydrogenated polymers useful in the process of the present invention to manufacture the hydroxyl-containing polymers of the present invention are described in copending, commonly assigned U.S. patent application Ser. No. 629,839, filed Apr. 29, 1991, Ser. No. 722,172 filed Oct. 7, 1991 and Ser. No. 863,579, "Epoxidized Elastomers for Exterior Block Crosslinking," filed concurrently herewith. Methods for making such polymers are described in detail in the above mentioned patent applications, which are herein incorporated by reference.

The last step of the process of the present invention involves reacting the epoxidized polymer with an alcohol having one unprotected hydroxyl group in the presence of a Lewis acid in a solvent. The polymers of the present invention, elastomeric block polymers of conjugated dienes which contain hydroxyl functionality, including highly reactive primary hydroxyl groups, in the diene blocks, are produced.

Lewis acids of the type $MX_n$, where M is B, Al, Fe or Sn and X is a halogen (F, Cl, Br, I), and organic complexes of these acids, are most suitable for catalyzing the conversion of the epoxy groups to hydroxyl groups. Other Lewis acids, such as dibutyl tin dilaurate, may provide adequate results if higher temperatures and longer reaction times are acceptable. Protic acid catalysts are not recommended, as gel formation and other side reactions were found to compete with the desired derivatization. The preferred catalysts for use herein are organic complexes of boron trifluoride, the most preferred catalysts being boron trifluoride diethyl etherate, boron trifluoride dibutyl etherate, boron trifluoride dimethyl etherate and boron trifluoride t-butyl methyl etherate. It is preferred that the molar ratio of catalyst to epoxy be from 0.1:1 to 1:1, with the most preferred ratio being from 0.1 to 0.2 moles of catalyst per mole of epoxy functionality. If this ratio is too low, there will be no conversion. It is most highly preferred in carrying out the process that the catalyst be diluted to a concentration of 1 meq in 0.4 to 2.0 milliliters of solvent, the solvent preferably being the same solvent that is used in the reaction. It is also preferred that the catalyst solution be added relatively slowly; for example, on the order of 1 to 10 milliliters per minute to a reactor containing 1 liter of a 10% w solution of epoxidized polymer in cyclohexane.

In a preferred embodiment of the present invention, the alcohol having one unprotected hydroxyl group is selected from monohydric alcohols, and derivatives of dihydric and trihydric alcohols having one unprotected hydroxyl and the remaining hydroxyl group(s) being protected as the acetal, ketal or carbonate. Monohydric alcohols include normal and secondary alcohols possessing from 1 to 10 carbons, most preferably n-butanol, n-propanol, n-pentanol, n-hexanol, n-heptanol and n-octanol. Derivatives of dihydric and trihydric alcohols having one unprotected hydroxyl and the remaining hydroxyls protected include acetals, ketals and carbonates of diols and triols and may have a structure like the following

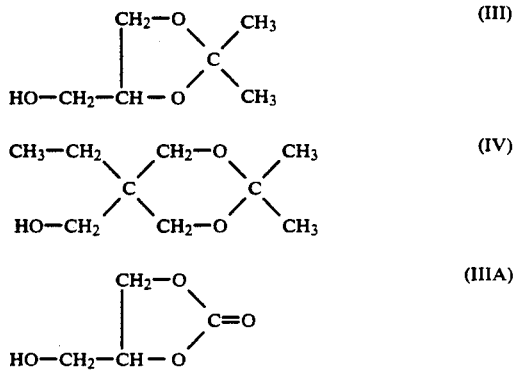

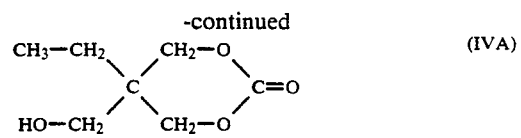

which are the formulas for Solketal (III, the acetone ketal of glycerine) and trimethylolpropane ketal (IV, the acetone ketal of trimethylolpropane) or the analogous carbonates (IIIA and IVA). The preparation of other suitable partially protected polyols is described in *Protective Groups in Organic Synthesis*, 2nd Edition, by T. W. Green and P. G. M. Wuts, published in 1991 by J. Wiley and Sons of N.Y., N.Y., which is herein incorporated by reference. The most preferred compounds for use herein include Solketal, butanol, trimethylolpropane ketal and octanol. It is preferred that the molar ratio of epoxy to this compound range from 1:2 to 1:30. A large excess of the compound is preferred to minimize crosslinking of the polymer. Thus, it is preferred that the epoxy to compound molar ratio be 1:15 to 1:25.

This reaction can be carried out at a temperature from 20° C. to 200° C. The preferred range is from 25° C. to 100° C. Lower temperatures will decrease the reaction rate and higher temperatures will promote side reactions, such as crosslinking and the formation of ketones or aldehydes. The process can be carried out for a period of from 15 minutes to 24 hours after the addition of the catalyst, but, in almost all cases, only 15 minutes (following the complete addition of catalyst solution) will be required to achieve adequate results.

The concentration of the epoxidized polymer in solution is also important. It may range from as little as 1 percent up to 30 percent. Higher solids levels encourage the formation of coupled (dimeric, trimeric, etc.) polymers due to intermolecular reactions of epoxy groups. Lower levels, from 10 to 20 percent, are preferred. The increase in coupling with increasing solids is greatest for high molecular weight linear polymers but is less for star polymers possessing relatively short (e.g., 3,000 to 10,000 molecular weight) arms.

A wide variety of solvents may be used in this process including aliphatic and aromatic hydrocarbons, halogenated hydrocarbons and acyclic ethers. These solvents are compatible with the boron trifluoride catalysts. If other Lewis acid catalysts are used, it is possible that other solvents will be acceptable. Surprisingly, the derivatization can be carried out by adding the alcohol and catalyst (and optionally adding extra solvent to achieve the desired solids level) to an epoxidation cement (polymer in cyclohexane, for example), from which the acetic acid was removed by washing with aqueous base, followed by water. Lewis acid-catalyzed reactions are often sensitive to moisture and the solubility of water in cyclohexane is significant.

It is quite surprising that the ketal-protected di- and trihydric alcohols will react with the epoxidized polymers to produce soluble polymers. Acetal and ketal protecting groups are generally thought to be highly labile in the presence of boron trifluoride catalysts. This means that it would be expected that the alcohol would be rapidly regenerated in the presence of boron trifluoride. Residual epoxy groups would be expected to react with the resulting highly-reactive primary alcohol groups in the presence of boron trifluoride, resulting in crosslinking. An indication of this is provided in *Protective Groups in Organic Synthesis*, 2nd Edition by T. W.

Greene and P. G. M. Wuts, published in 1991 by John Wiley & Sons Inc. of New York, which is herein incorporated by reference. The reference discusses a typical acetal, methoxy methylene acetal, and shows at pages 411, 412, 421 and 423 that this material is highly reactive to boron trifluoride. Based on this table, one would predict that reactions involving Solketal and trimethylolpropane ketal would lead to crosslinking as discussed above. In fact, the ketal protecting groups are removed during the course of the reaction or work-up; the polymer-bound ketals are not isolated. For Solketal, this results in attachment of a residue possessing one primary and one secondary alcohol to the polymer backbone through an ether linkage. For trimethylolpropane ketal, both of the hydroxyl groups are primary. Surprisingly, no increase in side reactions that lead to coupling is observed when using Solketal or trimethylolpropane ketal over what is observed for monohydridic alcohols when reacted with the same epoxidized polymer at the same percent solids and epoxy:alcohol molar ratio.

The polymers of the present invention are generally described above. If less than 0.1 Meq/g polymer of hydroxyl groups are present, there is insufficient functionality to achieve the advantages of the invention. More than 15 Meq/g can cause the polymer to be too water soluble and brittle after cure. A range of 0.25 to 9 Meq/g is preferred.

One preferred type of polymer within the scope of the present invention is a conjugated diene block polymer containing hydroxyl functionality, which may include highly reactive primary hydroxyl groups, in the diene blocks and having the formula

$$C_q-Y_p-(B_x-A)_r \quad \text{(V)}$$

where B is a block comprising primarily of hydrogenated conjugated diene, preferably butadiene, derived repeat units and x is 0 or 1. The B block may also contain low levels of epoxidized, ether-alcohol and/or unsaturated repeat units, subject to the limitation that no more than 1, preferably 0.6 and most preferably 0.3, Meq/g polymer of unsaturated double bonds remains in the polymer—all the B blocks described hereafter may also contain such units. A is a polymer block comprising ether-alcohol units of formula (I) in the Summary Section. The R radical groups may contain hydroxyl groups, one or both of which may be primary. The A block may also contain hydrogenated or epoxidized and/or unsaturated repeat units such that no more than 1, preferably 0.6 and most preferably 0.3, Meq/g polymer of unsaturated double bonds remains in the polymer (all the A blocks described hereafter may contain such units). C is A, B, and/or methacrylate or mixtures thereof and Y is a coupling agent or coupling monomers or initiator. From 0.1 to 15 Meq/g polymer, preferably 0.25 to 9 Meq/g, of hydroxyl groups are present in the polymer, preferably at least ⅓ of which are highly reactive primary alcohol groups and r<0, q≧0, r+q is from 1 to 100 and p is 0 or 1.

Still another preferred embodiment of the present invention has the formula

$$S_z-A-S_z \quad \text{(VI)}$$

wherein S is a block consisting of monoalkenyl aromatic hydrocarbon and z and z' are 0 or 1. A is a polymer block comprising ether-alcohol units of formula (I) in the Summary Section. A may also contain epoxidized diene monomer, hydrogenated diene monomer which may be a different diene monomer than that from which the ether-alcohol units are derived, monoalkenyl aromatic hydrocarbon and unhydrogenated diene monomer residues as described previously. Ether-alcohol units are present in an amount such that 0.1 to 15 Meq/g polymer, preferably from 0.25 to 9 Meq/g, of hydroxyl groups are present in the polymer, most preferably at least ⅓ of which are highly reactive primary groups. In a preferred embodiment of this invention, the A block consists of a copolymer of isoprene and butadiene and the majority of ether-alcohol units are derived from isoprene.

Also included herein are block polymers of the formula

$$S_z-A-S_z \quad \text{(VII)}$$

wherein S and A are as described in the preceding paragraph but the blocks are not hydrogenated. Another unhydrogenated polymer which falls within the scope of the present invention has the formula

$$C_qY_p-(B_x-A)_r \quad \text{(VIII)}$$

wherein B is a polymer block derived from a diene and A is a polymer block which contains a higher concentration of ether alcohol units than B and the rest of the terms are as described in formula (V) above. For all of the polymers above, it is preferred that at least ⅓ of the hydroxyl groups be primary hydroxyl groups, that B be derived from butadiene and A be derived from isoprene, that the amount of hydroxyl groups range from 0.25 to 9 Meq/g polymer. In another embodiment, the polymer contains up to 75% of a vinyl aromatic hydrocarbon.

The molecular weights of these polymers generally range from $2 \times 10^3$ to $5 \times 10^6$. The molecular weights of the A blocks generally range from 100 to 50,000, with 500 to 15,000 being most preferred. The molecular weights of the B blocks generally range from 100 to 200,000, with 13,000 to 50,000 being most preferred. The molecular weights of the C blocks generally range from 50 to 100,000, with 500 to 50,000 being most preferred. The molecular weight of the S blocks generally range from 100 to 50,000. In order to produce polymers having these molecular weights, the precursor polymers must be made so that the molecular weights thereof are similar. Some higher molecular weight species formed by coupling during the reaction with alcohol may also be present.

Molecular weights of linear polymers or uncoupled linear segments of polymers such as mono-, di-, triblock, and etc., or arms of star polymers before coupling are conveniently measured by Gel Permeation Chromatography (GPC), where the GPC system has been appropriately calibrated. Polymers of known molecular weight are used to calibrate and these must be of the same molecular structure and chemical composition as the unknown linear polymers or segments that are to be measured. For anionically polymerized linear polymers, the polymer is essentially monodisperse and it is both convenient and adequately descriptive to report the "peak" molecular weight of the narrow molecular weight distribution observed. Measurement of the true molecular weight of the final coupled star polymer is not as straightforward or as easy to make using GPC. This is because the star shaped molecules do not separate and elute through the packed GPC columns in the same manner as do the linear polymers used for the calibration, and, hence, the time of arrival at a UV or refractive index detector is not a good indicator of the molecular weight. A good method to use for a star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore size directly into the light scattering cell . The light scattering measurements are performed as a function of scattering angle and of polymer concentration using standard procedures. The differential refractive index (DRI) of the sample is measured at the same wavelength and in the same solvent used for the light scattering. The following references are herein incorporated by reference:

1. *Modern Size-Exclusion Liquid Chromatography*, M. W. Yau, J. J. Kirkland, D. D. Bly, John Wiley & Sons, New York, N.Y., 1979.
2. *Light Scattering from Polymer Solutions*, M. B. Huglin, ed., Academic Press, New York, N.Y. 1972.
3. W. Kay and A. J. Havlik, *Applied Optics*, 12, 541 (1973).
4. M. L. McConnell, *American Laboratory*, 63, May, 1978.

These polymers are intended for uses requiring functionality to add polarity and reactivity to the unfunctionalized molecules. In particular, these molecules are intended as rubber modifiers and vehicle constituents in coatings and sealants, especially polyurethane coatings and sealants. These products are useful in thermoset adhesives, sealants and coatings, especially the urethanes, polyesters and melamine-curing products. These polymers are also useful in asphalt modification where polarity is desirable. They are useful in fibers, films and printing plates, as well as for the modification of polyesters, polyethers and polyamides. The introduction of long hydrocarbon chains (by reaction with n-alcohols) is useful in preparing low $T_g$ saturated midblock polymers and pour point depressant viscosity index improvers. Reaction of these hydroxyl group-containing polymers with molecules containing electrophilic functional groups such as isocyanates, acid chlorides, carboxylic acids, etc., can be used to introduce new functionality to the polymer backbone. For example, acrylate groups can be introduced by reaction with methacrylic acid and isocyanate groups by reaction with excess toluene diisocyanate.

The polymers of the present invention are especially useful in coatings. Preferably, these polymers are crosslinked with isocyanate to create excellent coating materials. Isocyanate is used to crosslink the polymers via reaction with the hydroxyl functionality present in the polymer. Standard polyurethane chemistry is utilized for the reaction of the polymer with the isocyanate. For example, see "Coatings Based on Polyurethane Chemistry: An Overview and Recent Developments" by T. A. Potter and J. L. Williams, *Journal of Coatings Technology*, Vol. 59, No. 749, June 1987, pps. 63–72, which is herein incorporated by reference. Monomeric isocyanates can be used for the crosslinking of functionalized polymers. Monomeric isocyanates suffer from the disadvantage that they are highly toxic. In order to reduce the problems caused by using such materials, isocyanate adducts are often used in place of the monomeric isocyanates. Both types have the advantage that the reaction will take place at room temperature. It is also possible to use blocked isocyanates. Isocyanates are blocked by reaction with a volatile hydroxy material in order to keep them from reacting with the hydroxy functionalized block polymer. The isocyanate is regenerated when heat is applied. This is described in the article referred to above. Such blocked isocyanates are useful, for example, in baked coatings. The material will be coated onto a substrate which will then be heated. The blocking agent will leave the coating under the influence of heat and crosslinking of the hydroxy functionalized block polymer will take place.

These polymers may also be crosslinked and cured with amino resins and anhydrides. For instance, see *50 Years of Amino Coating Resins*, edited and written by Albert J. Kirsch, published in 1986 by American Cyanamid Company, which describes in detail a whole series of amino resins which are useful in the present invention. It is stated therein on page 20 that the backbone polymers, i.e., the polymers which are to be crosslinked, "must contain one or more of the functional groups—hydroxy, carboxy, amide—listed above to be useful with amino resins". The foregoing publication is herein incorporated by reference. Anhydrides are used to cure OH groups in baked coatings (heating with phthalic anhydride, for example).

The crosslinked materials of the present invention are useful in adhesives, sealants, coatings, films (such as those requiring heat and solvent resistance), etc. In addition to the hydroxy-functionalized polymer and any curing aids or agents, products formulated to meet performance requirements for particular applications may include various combinations of the following types of ingredients.

Resin

In many applications, especially in adhesives and sealants, it may be necessary to add an adhesion promoting or tackifying resin that is compatible with the rubbery midblock of the polymer. A common tackifying resin is a diene-olefin copolymer of piperylene and 2-methyl-2-butene having a softening point of 95° C. This resin is available commercially under the tradename Wingtack ® 95 and is prepared by the cationic polymerization of 60% piperylene, 10% isoprene, 5% cyclopentadiene, 15% 2-methyl-2-butene and about 10% dimer, as taught in U.S. Pat. No. 3,577,398. Other tackifying resins may be employed wherein the resinous copolymer comprises 20–80 weight percent of piperylene and 80–20 weight percent of 2-methyl-2-butene. The resins normally have softening points (ring and ball) between 80° C. and 115° C.

Other adhesion promoting resins which are also useful include hydrogenated rosins, esters of rosins, polyterpenes, terpenephenol resins and polymerized mixed olefins, lower softening point resins and liquid resins. Examples of low softening point or liquid resins include Adtac ® LV, Piccolastic A5, Piccovar AP10, and Piccolyte S25 resins from Hercules. To obtain good thermo-oxidative and color stability, it is preferred that the tackifying resin be a saturated resin, e.g. , a hydrogenated dicyclopentadiene resin such as Escorez ® 5000 series resin made by Exxon or a hydrogenated polystyrene or polyalphamethylstyrene resin such as Regalrez ® resin made by Hercules. The amount of adhesion promoting resin employed varies from 10 to 400 parts by weight per hundred parts rubber (phr), preferably between 20 to 350 phr. The selection of the particular tackifying agent is, in large part, dependent upon the specific polymer employed in the respective adhesive composition.

Optionally, an arene-block-compatible resin may be employed. Compatibility is judged by the method disclosed in U.S. Pat. No. 3,917,607. Normally, the resin should have a softening point above 100° C., as determined by ASTM method E 28, using a ring and ball apparatus. Mixtures of arene block-compatible resins having high and low softening points may also be used. Useful resins include coumaroneindene resins, polystyrene resins, vinyl toluene-alphamethylstyrene copolymers, and polyindene resins. Much preferred is a coumarone-indene resin. The amount of arene-block-compatible resin varies from 0 to 200 phr.

Plasticizer

An adhesive composition may contain plasticizers, such as rubber extending plasticizers, or compounding oils. Rubber compounding oils are well-known in the art and include both high saturates content oils and high aromatics content oils. Preferred plasticizers are highly saturated oils, e.g. Tufflo ® 6056 and 6204 oil made by Lyondell and process oils, e.g. Shellflex ® 371 oil made by Shell. Higher aromatic content oils include Tufflo ® 11 and Shellflex ® 212. The amounts of rubber compounding oil employed in the invention composition can vary from 0 to 500 phr, preferably 0 to 100 phr, and most preferably Between 0 and 60 phr.

Filler

Various types of fillers and pigments can be included in the coating formulation. This is especially true for exterior coatings in which fillers are added not only to create the desired appeal but also to improve the performance of the coating such as its weatherability. A wide variety of fillers can be used. Suitable fillers include calcium carbonate, clays, talcs, zinc oxide, titanium dioxide and the like. The amount of filler usually is in the range of 0 to 70% w based on the solvent free portion of the coating, depending on the type of filler used and the application for which the coating is intended. An especially preferred filler is titanium dioxide.

Solvent

If the coating will be applied from solvent solution, the organic portion of the coating will be dissolved in a solvent or blend of solvents. Aromatic hydrocarbon solvents such as toluene, xylene, or Shell Cyclo Sol 53 are suitable. If desired, it is usually possible to obtain lower viscosity by using a solvent blend consisting of an aromatic hydrocarbon solvent with a polar solvent. Suitable polar solvents include esters such as isopropyl acetate, ketones such as methyl isobutyl ketone, and alcohols such as isopropyl alcohol. The amount of polar solvent used depends on the particular polar solvent chosen and on the level of functionality on the functionalized hydrogenated block copolymer. Usually, the amount of polar solvent used is from 0 to 50% w in the solvent blend.

Stabilizer

Antioxidants and UV inhibitors can be added to the formulations to protect the products against degradation by oxidation or by exposure to sunlight during preparation and use of the compositions. Combinations of stabilizers are often more effective, due to the different mechanisms of degradation to which various polymers are subject.

The primary component of the antioxidant portion of the stabilizer package will be a hindered phenol type antioxidant. Examples of commercially available antioxidants of this type are ETHANOX 330 (from Ethyl Corporation), CYANOX 2246 (from American Cyanamid) and IRGANOX 1010 (from Ciba Geigy). A wide variety of secondary antioxidants and synergists can also be included in the formulation. Examples include zinc dialkyl dithiocarbamates such as BUTYL ZIMATE (from Vanderbilt), phosphite esters such as WESTIN 618 (from General Electric), and sulfur bearing compounds such as dilaurylthio-dipropionate, CYANOX LTDP (from American Cyanamid). Antioxidants are usually used in the formulation at concentrations from 0.05% w to 5% w.

The UV inhibitor portion of the stabilizer package will usually be composed of a combination of a UV light absorbing type compound and a hindered amine light stabilizer. Typical absorbing type UV inhibitors include the benzophenone type such as CYASORB UV 531 (from American Cyanamid) and the benzotriazole type such as TINUVIN P and TINUVIN 328 (both from Ciba Geigy). Typical hindered amine light stabilizers include TINUVIN 770 (from Ciba Geigy) and SANDUVOR 3056 (from American Cyanamid). UV inhibitors which contain a metal, such as the nickel containing UV inhibitor, CYASORB UV 1084 (from American Cyanamid) can also be used. These UV inhibitors will generally be included in the formulation at concentrations from 0.05% w to 10% w.

Protective pigments and fillers can also improve the resistance to degradation by exposure to sunlight. Examples include carbon black, zinc oxide and titanium dioxide.

Compositions of the present invention are typically prepared by blending the components at an elevated temperature, preferably between 50° C. and 200° C., until a homogeneous blend is obtained, usually less than three (3) hours. Various methods of blending are known to the art and any method that produces a homogeneous blend is satisfactory. The resultant compositions may then preferably be used in a wide variety of applications. Alternatively, the ingredients may be blended into a solvent.

Adhesive compositions containing the polymers of the present invention may be utilized as many different kinds of adhesives, for example, laminating adhesives, flexible packaging laminating adhesives, contact adhesives, assembly adhesives, pressure sensitive adhesives, tie layers, hot melt adhesives, solvent borne adhesives and waterborne adhesives in which the water has been removed before curing. The adhesive can consist of simply the hydroxyl-functionalized polymer or, more commonly, a formulated composition containing a significant portion of the hydroxyl-functionalized polymer along with other known adhesive composition components, and, possibly, a crosslinking agent. The incorporation of alcohols in epoxy formulations intended for cationic cure has been observed to increase the cure rate; a preferred composition for cationic cure contains both hydroxyl-functionalized and epoxidized polymer. Cationic cure may be initiated by E-beam radiation or UV light in the presence of appropriate photoinitiators or by thermally activated initiators.

EXAMPLES

Example 1

Two different precursor polymers were used in this example. Polymer A was a linear unsaturated styrene-isoprene-styrene block copolymer having a peak molecular weight as determined by gel permeation chromatography of 160,000 and a polystyrene content of 15%. Polymer B was prepared from an unsaturated linear styrene-(butadiene/isoprene)-styrene block copolymer in which about 1.5 Meq/g of isoprene units were randomly distributed in the midblock and having a peak molecular weight of 50,000 and a styrene content of 30%. Polymer A was not hydrogenated at all but Polymer B was partially hydrogenated such that 1.2 Meq of olefinic double bonds remained in the polymer. The partial hydrogenation was carried out as follows: Polymer in cyclohexane was reacted with a catalyst prepared by reacting nickel 2-ethylhexanoate with triethyl aluminum (about 2.3 moles of Al per mole of Ni) and hydrogen at 500 psi, at a temperature of 70° C. About 13 ppm of Ni ($1.8 \times 10^{-3}$ mole per gram of polymer), was used. The catalyst and residual lithium were washed out. Both polymers were epoxidized by reaction with peracetic acid at about 45° C.; acid was added over about 60 minutes, and then the solution was held at 45° C. for about 6 hours. About 1 Meq of peracetic acid per Meq of residual olefin in polymer B was added; one Meq of peracetic acid was added to polymer A for every Meq of epoxy desired in the final product. The acetic acid and residual peracetic acid were neutralized and the polymer solution was thoroughly washed with water. Epoxidized Polymer A contained 1.30 Meq epoxy per gram of polymer and epoxidized Polymer B contained 0.85 meq epoxy per gram of polymer.

To convert the epoxy to hydroxyl functionality, the polymers were dissolved at 10 weight percent in a mixture of toluene and alcohol (n-butanol or n-octanol). After purging with nitrogen, boron trifluoride diethyl etherate (0.15 mole per mole of epoxy) in 15-25 milliliters of toluene was added dropwise at room temperature. Exotherms of 2° to 30° C. were observed. The solution was heated to 1050C for the desired reaction time (see Table 1). When it was cooled, the polymer cement was washed with an excess (150 volume percent) of aqueous sodium carbonate and then water, precipitated into isopropanol and then dried under vacuum. Soluble products were isolated in all cases. Titration for residual epoxy was performed by the widely used method of adding a solution of tetraethyl ammonium bromide (TEABr) in acetic acid and titrating the acetate produced by reaction of the epoxy groups with standardized perchloric acid. The extent of conversion of epoxy groups to the ether-alcohol groups could be inferred from the decrease in epoxy functionality following reaction. $^1$H NMR was also used to follow the reaction. $^1$H NMR analysis of the unsaturated precursor of polymer B and the epoxidized product was used to determine the distribution of epoxidized-olefin structures in polymer B; about 45% of the epoxy groups were derived from 1,4 isoprene repeat units, 30% from 3,4 isoprene repeat units, and 25% from 1,2 butadiene repeat units; essentially all of the unsaturation in the precursor to polymer A was due to 1,4 isoprene repeat units. The $^1$H NMR spectra of the alcohol derivatives contained resonances due to protons alpha to hydroxyl and ether oxygen, resolved from resonances due to protons alpha to the epoxy oxygen. Using the known distribution of epoxidized repeat unit structures, it was possible to estimate the number of Meq of epoxy (E) units and ether-alcohol (DE) units, and thus, the extent of reaction. The extent of reaction (% Reaction) was determined by the following formula: $100 \times DE_{NMR}/E_{initial}$, where $E_{initial}$ is the epoxy content of the epoxidized precursor, as determined by $^1$H NMR, and $DE_{NMR}$ is the DE content of the derivatized polymer (all are measured in Meq/g).

TABLE 1

| Starting Polymer | Reaction Condit. | Reaction Time | $^1$H NMR | | | Titration | | |
|---|---|---|---|---|---|---|---|---|
| | | | E | DE | % Reaction | E | DE | % Reaction |
| B | 1 | 24 h | 0.11 | 0.66 | 82$^a$ | 0.01 | 0.84 | 99 |
| A | 1 | 45 min. | — | 1.04 | 80$^b$ | 0.13 | 1.24 | 90 |
| A | 1 | 6 h | — | 1.03 | 80$^b$ | 0.13 | 1.24 | 90 |
| A | 1 | 24 h | — | 0.99 | 76$^b$ | 0.11 | 1.26 | 92 |
| B | 2 | 1 h | — | — | — | 0.08 | 0.77 | 90 |
| B | 2 | 6 h | — | — | — | 0.07 | 0.78 | 92 |

Reaction Condition:
1—75:25 toluene:butanol, 105° C., 15 mole % BF$_3$.OEt$_2$
2—85:15 toluene:octanol. 105° C., 15 mole % BF$_3$.OEt$_2$
$^a$E$_{initial}$ = 0.85 Meq/gm
$^b$E$_{initial}$ = 1.30 Meq/gm Polymer B was reacted with n-butanol or n-octanol as described above. A soluble white product was obtained and very little emulsification occurred during the workup in all instances. Titration and NMR revealed high conversion of epoxy units (E) to ether-alcohol (DE). The Fourier Transform Infrared (FTIR) spectrum exhibited the expected hydroxyl and ether bands. Little, if any, ketone or aldehyde functionality could be detected. Gel Permeation Chromatography (GPC) was used to look for changes in polymer molecular weight due to degradation or coupling (reaction between molecules to create dimers, trimers, etc.). There was no evidence of low molecular weight species (degradation), however, the derivatized polymers contained some 15-20% dimer, 8-10% trimer, 4-5% tetramer and 5-10% higher coupled products.

The reaction was repeated using Polymer A. Titration indicated extensive reaction of the epoxy groups in the first 45 minutes. The products became discolored for reaction times longer than 45 minutes and the 24 hour product was quite yellow. FTIR showed a decrease in the hydroxyl intensity relative to that of the ether band as the reaction time increased which is consistent with dehydration to give vinyl ether units. These results clearly demonstrate that shorter reaction times are more favorable for unsaturated epoxidized polymer substrates.

The $^{13}$C NMR spectrum of the Polymer A derivative exhibited resonances that are most consistent with ring opening of the 1,4-isoprene epoxy to give the least substituted secondary hydroxyl group. Based on this data, it appears that isoprene-derived epoxies open to give the most reactive (least substituted) hydroxyl functionality as shown in formula (I) in the Summary Section. Assuming that secondary alcohols are also produced in the reaction of Polymer B with butanol, the alcohol titration and ¹H NMR results indicate that about 30 relatively reactive secondary hydroxyl groups are introduced to each Polymer B molecule.

Example 2

In this example, the epoxidized versions of Polymers A and B were reacted with Solketal. The 25 grams of polymer was dissolved to 10% by weight in a mixture of toluene and Solketal, the reactor was purged with nitrogen and a solution of boron trifluoride diethyl etherate in 15 milliliters of toluene was added dropwise at room temperature. Exotherms of 3° to 4° C. were observed. The solution was stirred at room temperature or heated for a period of time (see Table 2). The solution was then washed with an excess (150 volume percent) of aqueous sodium carbonate and then water, precipitated in isopropanol and then dried at 35°-50° C. under vacuum. Titrations for residual epoxy and ¹H NMR analysis were performed as described in Example 1. The titration data are summarized in Table 2.

TABLE 2

| Starting Polymer | Reaction Time | Reaction Temp. | ¹H NMR E | DE | % Reaction | Titration E | DE | % Reaction |
|---|---|---|---|---|---|---|---|---|
| B$^a$ | 1 hr | 105° C. | — | 0.43 | 54$^c$ | 0.15 | 0.68 | 80 |
| B$^a$ | 15 min. | room | .26 | 0.53 | 66$^c$ | 0.23 | 0.63 | 73 |
| A$^b$ | 15 min. | room | ~0 | 0.68 | 52$^d$ | 0.05 | 1.32 | 96 |

$^a$15% BF$_3$.OEt$_2$ relative to epoxy functionality, Solketal:toluene of 15:85
$^b$10% BF$_3$.OEt$_2$ relative to epoxy functionality, Solketal:toluene of 25:75
$^c$E$_{initial}$ = 0.85, Meq/g
$^d$E$_{initial}$ = 1.3, Meq/g Temporarily masking the reactivity of a functional group through conversion to a derivative (protecting group) that is stable under a given set of conditions, yet easily converted to the original form under other conditions, is a common strategy in organic synthesis. Protection of two of the hydroxyl groups of a triol as a ketal resulted in a product that was found to react with epoxidized repeating units in the polymer as a monofunctional alcohol. Exposure to aqueous acid, for example, is expected to hydrolyze the ketal (deprotection) to the diol. For Solketal, this results in one primary and one secondary alcohol group.

In the first experiment, Polymer B was reacted with Solketal under conditions similar to those used in Example 1. After the catalyst was added, the reaction was heated to 105° C. Initially, no gel formation occurred and titration indicated nearly complete epoxy consumption. However, the polymer was discolored by heating and had a tendency to crosslink during storage. Later, it was determined that reaction with epoxy groups was essentially complete after catalyst addition at room temperature. The lower value for the number of DE units in the polymer prepared at 105° C., despite comparable epoxy consumption (by titration), suggests that some degradation of the ether-triol may occur at this temperature. The polymers prepared at room temperature were white and remained soluble. In all cases, the FTIR spectra of the reaction products exhibited bands characteristic of the ether-alcohol. The intensity of the hydroxyl band suggested the presence of more than one hydroxyl per repeat unit. Again, little, if any, evidence of ketone or aldehyde functionality was observed. Acid catalyzed hydrolysis in tetrahydrofuran resulted in no change in the spectrum. From this data, it can be concluded that deprotection takes place during the reaction or during product isolation. Ketal groups are reported to be labile in the presence of Lewis acids. The NMR and titration data suggest that the extent of conversion was comparable to that which was observed for reactions of Polymer B with the monohydridic alcohols of the previous example. This indicates that about 90 hydroxyl groups are introduced per molecule, at least 30 of which are highly reactive primary groups. Gel permeation chromatography (GPC) chromatograms of these materials were nearly identical to those of the monohydric alcohol derivatives; generation of the triol structure did not lead to increased coupling.

The experiment with Polymer A resulted in a soluble white product. The product obtained by reaction of this polymer at 105° C. was insoluble. As with the Polymer B derivative, generation of the triol product did not lead to gelation The NMR and FTIR results were consistent with the expected ether-alcohol product. The low yield of derivatized (DE) units by ¹H NMR suggests that side reactions may have consumed some of the epoxy functionality.

The Solketal derivative of Polymer A was reacted with acetic anhydride in pyridine. FTIR spectroscopy of the product revealed substantial esterification, as would be expected if highly reactive primary hydroxyl groups are present. Reaction of the corresponding butanol derivative resulted in little esterification. Clearly, more reactive hydroxyl groups are introduced by reaction with Solketal than were introduced by reaction with butanol.

Example 3

This example reports the results of using the process of the present invention on a molecule which is specifically designed to meet coatings requirements. For coatings in which the polymer is expected to be a vehicle constituent rather than a modifier, the polymer should have a low viscosity (pourable at or near room temperature) and a high enough T$_g$ to produce a relatively hard coating, as well as possess sufficient polarity to impart reasonable compatibility with relatively polar co-reagents, such as isocyanates for example, and solvents.

The polymer used in this example has the following structure

DVB[(EB)S-eI]$_n$ where DVB is divinylbenzene, the coupling agent, EB is polyethylene/butylene (hydrogenated polybutadiene), S is polystyrene, eI is epoxidized polyisoprene and n is 15–20. The arm molecular weight is approximately 5100. The arm consists of a 50/50 w/w EB/S random copolymer attached to the DVB core on one end and attached to a 500 MW polyisoprene block on the other end. The overall molecular weight of the star polymer is approximately 88,000.

This polymer was made by making a star polymer with butadiene/styrene-isoprene arms, partially hydrogenating the polymer as described above to fully hydrogenate the butadiene segments and partially hydrogenate the isoprene segments and then epoxidizing the polymer as described above to produce the above polymer which has 0.65 meq of epoxy groups in the isoprene segments. The polymer was reacted with alcohol and boron trifluoride diethyl etherate as described above. The reaction conditions are summarized in Table 3. The catalyst (in the solvent) was added dropwise to the polymer and Solketal solution at room temperature. Fifteen minutes after all of the catalyst was added, the polymer cement was washed with dilute aqueous base and then water. The majority of the solvent was removed by evaporation in a hood and the polymer was further dried under vacuum.

The epoxidized star polymer was initially reacted under the conditions that had been most effective for Polymer B, namely 10% solids and 85:15 toluene:Solketal at room temperature using boron trifluoride diethyl etherate as the catalyst. As expected, the analytical results were consistent with substantial conversion of epoxy groups to the ether-triol. Derivatization could also be accomplished by adding Solketal and catalyst to the washed cement (epoxidized polymer in the solvent in which it was epoxidized, usually cyclohexane). The dibutyl etherate was used as the catalyst since the diethyl etherate was insoluble in cyclohexane. There was no evidence of the residual water in the cement interfering with the reaction in any way.

Titration, $^1$H NMR, FTIR and GPC were performed as described previously. Spectroscopic results consistent with conversion to the ether-triol were obtained. In addition, coupling, as determined by GPC, was dramatically decreased relative to the linear polymers of the previous example, prepared at the same solids level and Solketal:solvent ratio; only about 10-20% dimer is formed and little, if any higher coupled products. The extent of reaction indicates that about 1.5 derivatized repeat units (DE) are present per arm (22-30 per molecule), that is about 4.5 hydroxyl groups per arm (66-90 per molecule), at least ⅓ of which are primary.

percent in toluene. Then diphenyl methane diisocyanate (MONDUR M from Mobay) or isophorone diisocyanate (IPDI from Huls) was added, at a concentration of 1 meq per meq of epoxy in the starting polymer, to solutions of each polymer. 0.1 weight percent (relative to diisocyanate) of dibutyl tin dilaurate (BAYSILONE 162 from Mobay) was added with the IPDI as a catalyst. Thin films (2 mils) were then drawn onto glass and steel panels and thicker films (50 mils) were cast by pouring the solutions into release paper boats. A small amount of each solution was also cast onto a sodium chloride plate for FTIR. The films were allowed to dry at room temperature for two weeks, the first three types under ambient conditions and the FTIR samples in a desiccator, before any physical properties were measured. FTIR spectra were recorded after 1, 2, 4, 8 and 14 days. Films of the alcohol derivatives (no isocyanate) and films of the isocyanates with epoxidized Polymer B (no hydroxyl groups) were cast as controls.

All of the alcohol-containing polymers reacted with diisocyanates to form crosslinked networks but formation of a continuous network from the star polymer was slower. Samples of the formulations prepared from the Polymer B derivative left in bottles gelled overnight while those prepared from the star took at least a week to gel. None of the controls exhibited any viscosity increase. After two weeks, when samples of the films were placed in toluene, the isocyanate-cured alcohol derivatives swelled (about 50%) while maintaining their mechanical integrity, indicative of a tightly crosslinked network. All of the control samples dissolved completely.

The films prepared from the Polymer B derivative and cast onto glass exhibited high gloss, were tack free and felt somewhat harder than the uncured control, but suffered from "orange peel", as did the uncured control and the Polymer B (no hydroxy)-based coatings, a defect associated with poor wetting of the surface by the coating formulation. The MONDUR M-cured coating was somewhat hazy, indicative of poor compatibility with the highly aliphatic polymer. The corresponding film prepared from Polymer B (no hydroxy) was completely opaque.

The appearance of the coatings prepared from the star polymer (Polymer C) derivative was much better.

TABLE 3

| Toluene:CH:Solketal | % Catal.[a] | $^1$H NMR | | | Titration | | |
|---|---|---|---|---|---|---|---|
| | | E | DE | % Reaction[d] | E | DE | % Reaction |
| 85:0:15 | 10[b] | .34 | .30 | 46 | .26 | .39 | 60 |
| 41:35:15 | 15[b] | .32 | .33 | 50 | .24 | .41 | 63 |
| 0:85:15 | 15[c] | .30 | .35 | 53 | .23 | .42 | 65 |

[a]Relative to epoxy functionality
[b]BF$_3$.OEt$_2$
[c]BF$_3$.OBu$_2$
[d]E$_{initial}$ = 0.65 Meq/g Example 4

In this example, Solketal derivatives of Polymer B and the star polymer of Example 3 (Polymer C) were cured with aromatic and aliphatic isocyanates to form polyurethane coatings. Coatings prepared from the star derivative exhibited good clarity and surface appearance and, although rather soft, possessed reasonable chemical resistance and adhesion.

These coatings were prepared by dissolving Polymer B (0.85 meq epoxy/g) and Polymer C (0.65 meq epoxy/g), reacted with Solketal and boron trifluoride diethyl etherate as described previously, to 20 weight Both of the coatings exhibited high gloss, no orange peel and were much harder and less tacky than the uncured control. The IPDI-cured coating was crystal clear, but slightly tacky, while the MONDOR M-cured coating was free of tack but slightly cloudy in thick sections. The polymer was completely compatible with the aliphatic isocyanate.

The films were evaluated for mechanical properties. The appearance was judged visually. The pencil scratch and gouge tests were performed according to the standard method of drawing successively harder pencil leads across the coating until it was scratched or gouged, respectively. The MEK (methyl ethyl ketone) rub cycles test was performed according to the standard method of drawing an MEK-moistened cloth across the coating for 100 cycles, or until breakthrough to the substrate occurred (one cycle equals one forward and one backward stroke). The results are shown in Table 4.

TABLE 4

| Polymer | Isocyanate | Appearance | Pencil Hardness[a] Scratch | Gouge | MEK Rub Cycles |
|---|---|---|---|---|---|
| B | — | op,g,c | F | H | — |
| B | MONDUR M | op,g,h | F | H | — |
| B | IPDI | op,g,c | B | HB | — |
| Star | — | vt,c | F | H | 37 |
| Star | MONDUR M | sh,g | 2B | B | 100+ |
| Star | IPDI | c,g,t | F | H | 84 |
| B (no OH) | — | op,g,c | F | H | — |
| B (no OH) | MONDUR M | op,o | F | H | — |
| B (no OH) | IPDI | op,sh | F | H | — | op = Orange Peel, g = High Gloss, h = Hazy, o = Opaque, c = Clear, t = Tacky, vt = Very Tacky, sh = Slightly Hazy
[a]hardness scale (softest to hardest)
6B<5B<4B<3B<2B<B<HB<F<H<2H<3H<4H<5H<6H For the star polymer, a groove was quickly worn through the control (uncured) film in the MEK rub test, while both of the cured samples were fairly resistant. The sample cured with MONDUR M resisting over 100 rub cycles. The films of the Polymer B derivative pulled away from the substrate due to poor adhesion. As a result, meaningful MEK data could not be obtained.

Cure could also be followed by the evolution of the urethane carbonyl absorbance and corresponding decrease in isocyanate absorbance, using FTIR. These results suggest that cure was essentially complete for the aromatic isocyanate-cured coatings in less than 24 hours, while about 48 hours was required for the aliphatic isocyanate-cured coatings.

Example 5

The star polymer of Example 3 (polymer C) was reacted with n-butanol in toluene/cyclohexane at room temperature using boron trifluoride diethyl etherate, as described in Example 3, for the reaction with Solketal. Polymer C and Polymer B were also reacted with TMPK (acetone ketal of trimethylolpropane) at room temperature, as described for reaction with Solketal in Examples 2 and 3, respectively. Upon reaction with n-butanol, epoxidized repeat units are converted to the corresponding ether-alcohol, in which R=n-butyl and the only hydroxyl groups introduced are attached to the polymer backbone, primarily at secondary carbons. Reaction with TMPK introduces an R group possessing two primary hydroxyl groups, resulting in the corresponding ether-triol. Coupling, as determined by GPC, was comparable to what was reported for the corresponding derivatives of polymers B and C in previous examples. The reaction conditions and analytical results are summarized below.

TABLE 5

| Starting Polymer | Alcohol Reagent | $^1$H NMR | | | Titration | | |
|---|---|---|---|---|---|---|---|
| | | E | DE | % Reaction | E | DE | % Reaction |
| B | N-buOH[a] | 0.48 | 0.6 | 62% | 0.33 | 0.53 | 61% |
| B | TMPK[a] | 0.26 | 0.54 | 70% | 0.24 | 0.62 | 72% |
| C | n-buOH[b] | 0.21 | 0.45 | 70% | 0.22 | 0.43 | 66% |
| C | TMPK[b] | 0.26 | 0.39 | 60% | 0.16 | 0.49 | 75% |

[a]85:15 toluene:alcohol; 15% BF$_3$.OEt$_2$
[b]2.25:3.4:1 toluene:cyclohexane:alcohol; 15% BF$_3$.OEt$_2$ Example 6

In this example the butanol and TMPK derivatives of Example 5 were cured with aromatic and aliphatic isocyanates, as described in Example 4. All of the isocyanate-cured films were crosslinked (insoluble). While the MEK resistance was relatively low, improvement was observed relative to uncured controls. As in Example 4, films of Polymer B failed due to poor adhesion. None of the cured films were tacky, although the coatings were relatively soft. Reasonably good compatibility, resulting in clear films, was observed in most cases. For the coatings classed as "slightly hazy", the haziness was prominent only in thick sections. It is surprising that the butanol derivatives, lacking significant primary alcohol functionality, cured to form films with properties comparable to films prepared from primary alcohol-containing polymers. As the cost of reagents in the butanol derivatization is expected to be considerably lower, such products may be particularly important commercially. The properties of these coatings are summarized in Table 6, below

TABLE 6

| Polymer (Alcohol) | Isocyanate | Appearance | Pencil Hardness[a] Scratch | Gouge | MEK Rub Cycles |
|---|---|---|---|---|---|
| B (buOH) | — | g,op,c | F | H | — |
| B (buOH) | Mondur M | sh,op,g | F | H | — |
| B (buOH) | IPDI | c,op,g | F | H | — |
| B (TMPK) | — | g,c | F | H | — |
| B (TMPK) | Mondur M | c,g | F | H | — |
| B (TMPK) | IPDI | c,g | F | H | — |
| C (buOH) | — | c,g,t | <4B | <4B | 9 |
| C (buOH) | Mondur M | c,g | F | H | 52 |
| C (buOH) | IPDI | c,g | F | H | 38 |
| C (TMPK) | — | g,t,sh | 4B | 3B | 11 |
| C (TMPK) | Mondur M | sh,g | 2B | H | 39 |
| C (TMPK) | IPDI | sh,g | 2B | H | 45 | op = Orange Peel, g = High Gloss, h = Hazy, o = Opaque, c = Clear, t = Tacky, vt = Very Tacky, sh = Slightly Hazy
[a]hardness scale (softest to hardest)
6B<5B<4B<3B<2B<B<HB<F<H<2H<3H<4H<5H<6H

We claim:

1. A conjugated diene block polymer containing hydroxyl groups and having the formula

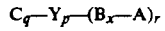

where B is a block comprising hydrogenated conjugated diene monomer and x is 0 or 1, and
where A is a polymer block comprising ether-alcohol units of the formula

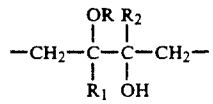     (F)

or

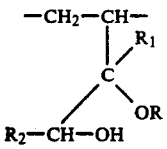 (G)

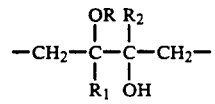 (F)

or

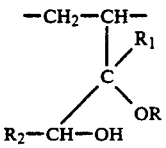 (G)

wherein R is selected from the group consisting of alkyl radicals containing up to 10 carbon atoms, monohydric and dihydric alcohol groups and carbonate groups, $R_1$ and $R_2$ are hydrogen or alkyl radicals wherein in (G) only one of $R_1$ and $R_2$ may be hydrogen, and where C is A, B and/or methacrylate or mixtures thereof, and wherein Y is a coupling agent or coupling monomers or initiator, and wherein from 0.1 to 15 Meq/g polymer of hydroxyl groups are present in the polymer, $r > 0$, $q \geq 0$, $r+q$ is from 1 to 100 and p is 0 or 1.

2. The polymer of claim 1 wherein at least ⅓ of the hydroxyl groups are primary hydroxyl groups and present as part of the ether radical.

3. The polymer of claim 1 wherein the polymer contains up to 75% of a vinyl aromatic hydrocarbon.

4. The polymer of claim 1 wherein the amount of hydroxyl groups is from 0.25 to 9 Meq/g polymer.

5. The polymer of claim 1 wherein A is derived primarily from isoprene and B primarily consists of butadiene repeat units.

6. The polymer of claim 1 wherein the polymer is crosslinked with an isocyanate.

7. A coating composition comprising the polymer of claim 6 and a UV inhibitor.

8. An unhydrogenated conjugated diene block polymer containing hydroxyl groups and having the formula $$C_q\text{—}Y_p\text{—}(B_x\text{—}A)_r$$

where B is a block comprising conjugated diene monomer and x is 0 or 1, and wherein A is a polymer block containing a higher concentration of ether alcohol units than B, said ether-alcohol units having the formula wherein R is selected from the group consisting of alkyl radicals containing up to 10 carbon atoms, monohydric and dihydric alcohol groups and carbonate groups, $R_1$ and $R_2$ are hydrogen or alkyl radicals wherein in (G) only one of $R_1$ or $R_2$ is hydrogen, and where C is A, B and/or methacrylate or mixtures thereof, and wherein Y is a coupling agent or coupling monomers or initiator, and wherein from 0.1 to 15 Meq/g polymer of hydroxyl groups are present in the polymer, $r > 0$, $q \geq 0$, $r+q$ is from 1 to 100 and p is 0 or 1.

9. The polymer of claim 8 wherein at least ⅓ of the hydroxyl groups are primary hydroxyl groups present as part of the ether radical.

10. The polymer of claim 8 wherein the polymer contains up to 75% of a vinyl aromatic hydrocarbon.

11. The polymer of claim 8 wherein the amount of hydroxyl groups is from 0.25 to 9 Meq/g polymer.

12. The polymer of claim 8 wherein A is derived primarily from isoprene and B is primarily comprised of butadiene repeat units.

13. The polymer of claim 8 wherein the polymer is crosslinked with an isocyanate.

14. A coating composition comprising the polymer of claim 13 and a UV inhibitor.

15. The polymer of claim 8 wherein the polymer is crosslinked with an amino resin.

16. A coating composition comprising the polymer of claim 15 and a UV inhibitor.

17. The polymer of claim 1 wherein the polymer is crosslinked with an amino resin.

18. A coating composition comprising the polymer of claim 17 and a UV inhibitor.

* * * * *